(12) United States Patent
Ninan et al.

(10) Patent No.: US 11,363,250 B2
(45) Date of Patent: Jun. 14, 2022

(54) AUGMENTED 3D ENTERTAINMENT SYSTEMS

(71) Applicant: Dolby Laboratories Licensing Corporation, San Francisco, CA (US)

(72) Inventors: Ajit Ninan, San Jose, CA (US); Neil Mammen, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 486 days.

(21) Appl. No.: 15/945,237

(22) Filed: Apr. 4, 2018

(65) Prior Publication Data

US 2018/0295351 A1 Oct. 11, 2018

Related U.S. Application Data

(60) Provisional application No. 62/484,157, filed on Apr. 11, 2017.

(51) Int. Cl.
| | |
|---|---|
| *H04N 13/344* | (2018.01) |
| *H04N 13/341* | (2018.01) |
| *H04N 13/337* | (2018.01) |
| *H04N 5/253* | (2006.01) |
| *H04N 13/128* | (2018.01) |
| *H04N 13/346* | (2018.01) |
| *H04N 13/00* | (2018.01) |

(52) U.S. Cl.
CPC .......... *H04N 13/344* (2018.05); *H04N 5/253* (2013.01); *H04N 13/128* (2018.05); *H04N 13/337* (2018.05); *H04N 13/341* (2018.05); *H04N 13/346* (2018.05); *H04N 2013/0081* (2013.01)

(58) Field of Classification Search
CPC .. H04N 13/344; H04N 13/337; H04N 13/128; H04N 13/341; H04N 13/346; H04N 5/253; H04N 2013/0081
USPC .......................................................... 348/53
See application file for complete search history.

(56) References Cited

U.S. PATENT DOCUMENTS

| | | | |
|---|---|---|---|
| 2009/0231697 A1* | 9/2009 | Marcus ..................... | H04N 3/10 359/462 |
| 2012/0105439 A1* | 5/2012 | Blumenthal ......... | H04N 13/122 345/419 |
| 2015/0061998 A1* | 3/2015 | Yang ................... | G06F 3/04815 345/156 |
| 2018/0081178 A1 | 3/2018 | Shpunt | |

(Continued)

FOREIGN PATENT DOCUMENTS

WO 2018/191312 10/2018

*Primary Examiner* — Joseph G Ustaris
*Assistant Examiner* — Matthew David Kim

(57) ABSTRACT

A wearable device comprises a left view optical stack for a viewer to view left view cinema display images rendered on a cinema display and a right view optical stack for the viewer to view right view cinema display images rendered on the cinema display. The left view cinema display images and the right view cinema display images form stereoscopic cinema images. The wearable device further comprises a left view imager that renders left view device display images, to the viewer, on a device display, and a right view imager that renders right view device display images, to the viewer, on the device display. The left view device display images and the right view device display images form stereoscopic device images complementary to the stereoscopic cinema images.

20 Claims, 11 Drawing Sheets

(56) References Cited

U.S. PATENT DOCUMENTS

2018/0120573 A1 5/2018 Ninan
2018/0164599 A1* 6/2018 Hu .................... G02B 27/0025
2018/0293752 A1 10/2018 Ninan
2018/0295352 A1 10/2018 Ninan

* cited by examiner

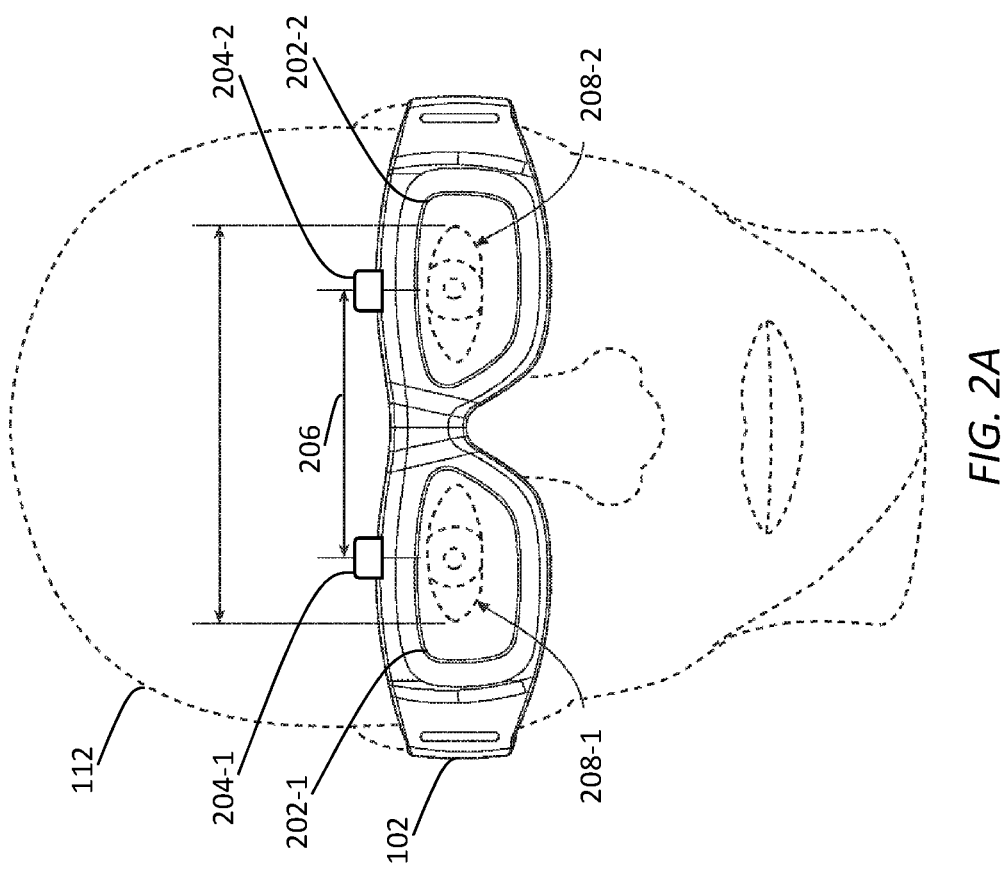

AUGMENTED 3D ENTERTAINMENT SYSTEMS

CROSS REFERENCE TO RELATED APPLICATIONS

This application claims priority to U.S. Provisional Patent Application No. 62/484,157, filed on Apr. 11, 2017, the disclosure of which is incorporated herein by reference in its entirety.

TECHNOLOGY

The present invention relates generally to entertainment systems, and in particular, to augmented three-dimensional (3D) entertainment systems.

BACKGROUND

When viewing a real-world object in a real-world scene, the human brain uses an accommodation process to control ciliary muscles to adapt each of eye lenses located behind pupils in the two eyes to specific focal lengths (or powers) to focus on the real-world object. At the same time, the human brain uses a vergence process to control extraocular muscles to simultaneously converge or diverge the two eyes toward the real-world object in order to support the perception of the real-world object as a 3D object.

By way of comparison, when viewing an object depicted in 3D images, the human brain uses an accommodation process to control the ciliary muscles to fix the eye lenses of the viewer's eyes to focus on a (e.g., cinema, etc.) display in order to support the clear vision of the 3D images rendered on the display, regardless of where the depicted object in the 3D images is supposed to be located. At the same time, the human brain uses a vergence process to control the extraocular muscles to simultaneously converge or diverge the eyes toward the depicted object in the 3D images in order to support the perception of the depicted object as a 3D object.

If the depicted object is of a relatively large negative parallax and thus is visually perceived as relatively close to the eyes in front of the display, the accommodation process still tries to fix the eyes on the display while the vergence process seeks to converge or diverge the eyes to the depicted object at a relatively close distance, thereby causing an accommodation-vergence conflict. This accommodation-vergence conflict in 3D image viewing is prone to inducing serious physiological discomforts/sickness; therefore, relatively large negative parallaxes are rarely used, especially for cinema 3D entertainment experiences.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 2A illustrates an example wearable device.

FIGS. 3A, 3B and 3C illustrate example video streaming servers and clients;

DESCRIPTION OF EXAMPLE EMBODIMENTS

Figure 1:
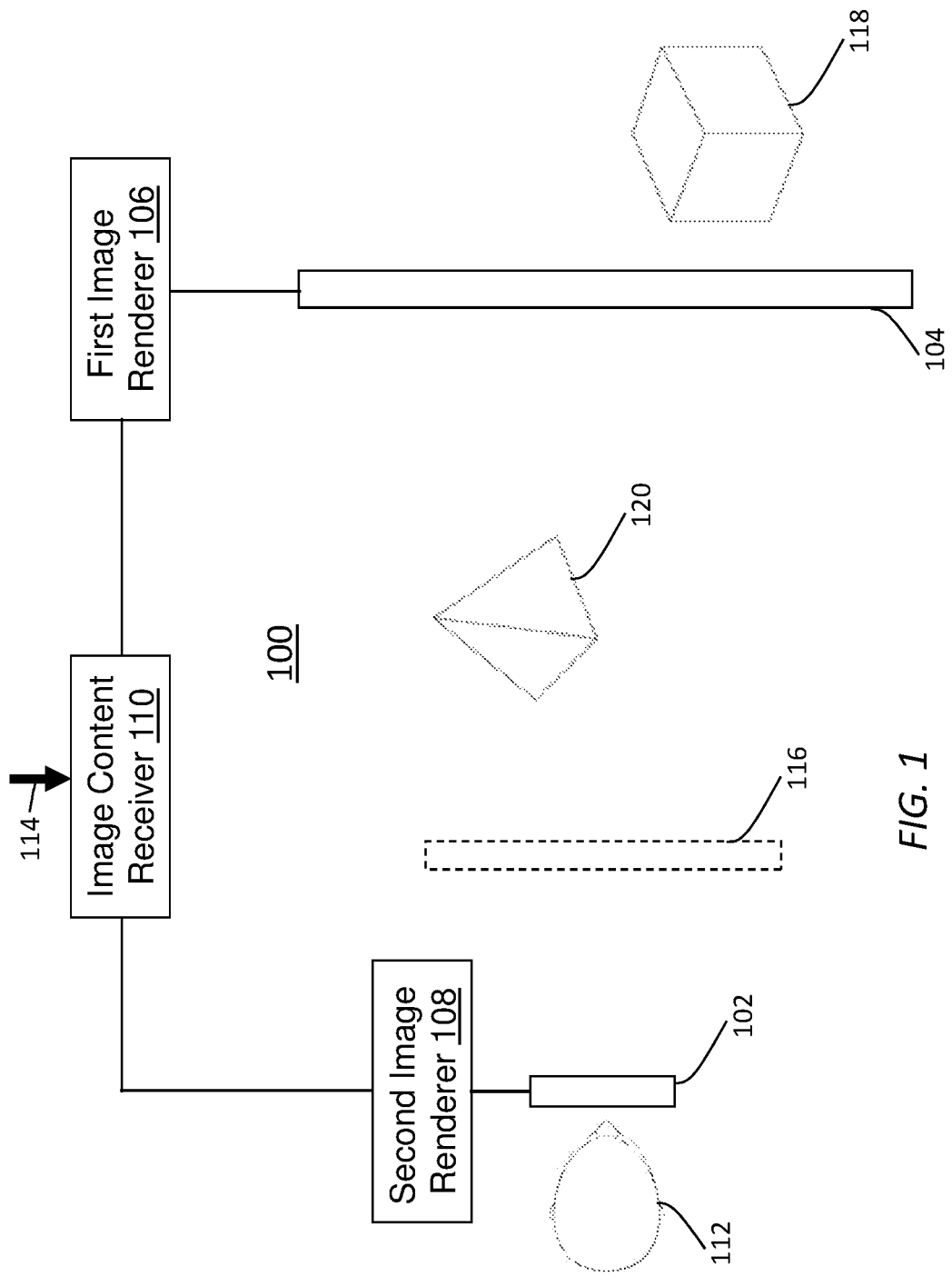
FIG. 1 illustrates an example configuration of an augmented entertainment system.

Example embodiments, which relate to augmented entertainment systems, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. AUGMENTED ENTERTAINMENT SYSTEM
3. WEARABLE DEVICE
4. CINEMA AND DEVICE DISPLAY IMAGES
5. RELATIVE MOTIONS BETWEEN DEVICE DISPLAY AND CINEMA DISPLAY
6. SPECTRAL SPATIAL SEPARATION
7. EXAMPLES OF OPTICAL STACKS
8. EXAMPLE PROCESS FLOWS
9. IMPLEMENTATION MECHANISMS—HARDWARE OVERVIEW
10. EQUIVALENTS, EXTENSIONS, ALTERNATIVES AND MISCELLANEOUS

1. GENERAL OVERVIEW

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Example embodiments described herein relate to wearable devices used with an augmented entertainment system. A wearable device comprises: a left view optical stack for a viewer of the wearable device to view left view cinema display images rendered on a cinema display; a right view optical stack for the viewer to view right view cinema display images rendered on the cinema display. The left view cinema display images as viewed by the viewer through the left view optical stack and the right view cinema display images as viewed by the viewer through the right view optical stack form stereoscopic cinema images. The wearable device further comprises: a left view imager that renders left view device display images, to the viewer, on a device display of the wearable device; a right view imager that renders right view device display images, to the viewer, on the device display of the wearable device. The left view device display images as viewed by the viewer through the left view imager and the right view device display images as viewed by the viewer through the right view imager form stereoscopic device images complementary to the stereoscopic cinema images.

Example embodiments described herein relate to rendering images in an augmented entertainment system. Left view cinema display images are rendered for a viewer of a wearable device to view through a left view optical stack of the wearable device. Right view cinema display images are rendered for the viewer to view through a right view optical stack of the wearable device. The left view cinema display images as viewed by the viewer through the left view optical stack and the right view cinema display images as viewed by the viewer through the right view optical stack form stereoscopic cinema images. A left view imager of the wearable device is used to render left view device display images, to the viewer, on a device display of the wearable device. A right view imager of the wearable device is used to render right view device display images, to the viewer, on the device display. The left view device display images as viewed by the viewer through the left view imager and the right view device display images as viewed by the viewer through the right view imager form stereoscopic device images complementary to the stereoscopic cinema images.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. AUGMENTED ENTERTAINMENT SYSTEM

FIG. 1 illustrates an example configuration 100 of a (e.g., 3D, etc.) augmented entertainment system that comprises a wearable device 102, a cinema display 104, a cinema image renderer 106, a device image renderer 108, an image content receiver 110, etc. Some or all of the components/devices as depicted in FIG. 1 may be implemented by one or more mechanical components, one or more electrooptical components, one or more computing devices, modules, units, etc., in software, hardware, a combination of software and hardware, etc. Some or all of the components/devices as depicted in FIG. 1 may be communicatively (e.g., wirelessly, with wired connections, etc.) coupled with some other components/devices as depicted in FIG. 1 or with other components/devices not depicted in FIG. 1.

Examples of the cinema display (104) may be a screen display in a cinema, a display in a home entertainment system, etc. In some embodiments, the cinema display (104) may be stationary in a 3D space (e.g., a cinema, a house, a venue, etc.) in which the cinema display (104) resides.

In some embodiments, the image content receiver (110) receives, from one or more image content sources, input image content 114 for rendering to one or more viewers (e.g., 112, etc.). The input image content (114) may be received in and decoded from one or more of: video signals, video files, video streams, etc. Example image content sources include, but are not necessarily limited to only, one or more of: data repositories, media content servers, media streaming servers, VR systems, AR systems, remote presence systems, video gaming systems, etc.

Example input image content may include, but is not necessarily limited to only, any of: stereoscopic images each of which comprises a left view and a right view, multi-view images each of which comprises two or more views, etc.

By way of example but not limitation, the input image content (114) is carried in a multi-layer multi-view video signal that comprises a cinema image layer and one or more device image layers for rendering one or more multi-view images. The image content receiver (110) can decode or demultiplex the multi-layer multi-view video signal, or the input image content (114) therein, into single-layer images in the cinema image layer and the one or more device image layers.

From the cinema image layer of the multi-layer multi-view video signal, the image content receiver (110) identifies or generates one or more multi-view single-layer cinema images. The one or more multi-view single-layer cinema images may depict a first proper subset of one or more visual objects (e.g., 118, etc.) in a plurality of visual objects (e.g., 118, 120, etc.) depicted by one or more multi-view (e.g., unlayered, etc.) images, from which the single-layer images in the cinema image layer and the one or more device image layers were derived.

From the one or more device image layers of the multi-layer multi-view video signal, the image content receiver (110) identifies or generates one or more multi-view single-layer device images. The one or more multi-view single-layer device images may depict one or more proper subsets of one or more visual objects (e.g., 120, etc.) in the plurality of visual objects (e.g., 118, 120, etc.) depicted by the one or more multi-view images.

In some embodiments, the image content receiver (110) sends or otherwise provides, the one or more multi-view single-layer cinema images of the one or more multi-view images to the cinema image renderer (106). Furthermore, the image content receiver (110) sends or otherwise provides the one or more multi-view single-layer device images of the one or more multi-view images to the device image renderer (108).

Based on the one or more multi-view single-layer cinema images, the cinema image renderer (106) can render one or more cinema display images, on the cinema display (104), such as one or more 3D cinema images comprising one or more left view cinema images and one or more right view cinema images. Likewise, based on the one or more multi-view single-layer device images, the device image renderer (108) can cause the wearable device (102) to render one or more device display images such as one or more 3D device images comprising one or more left view device images and one or more right view device images on a device display 116, for example by way of light rays emitted by imager(s) in the wearable device (102).

In operational scenarios in which a multi-view image comprises a plurality of different single-view images, the cinema image renderer (106) and/or the device image renderer (108) may identify or select a left view image and a right view image from among the plurality of different single-view images in the multi-view image. Additionally, optionally or alternatively, one or both of the left view image and the right view image may be generated by interpolating or combining (some or all in) the plurality of different single-view images in the multi-view image.

In some embodiments, the first proper subset of visual objects (e.g., 118, etc.) as rendered in the cinema display images on the cinema display (104) and the one or more second proper subsets of visual objects (e.g., 120, etc.) as rendered in the device display images on the wearable device (102) collectively depict the plurality of visual objects (e.g., 118, 120, etc.) located at different spatial locations in a 3D image space. These spatial locations in the 3D image space may be specified or described in spatial information that was used to partition the plurality of visual objects depicted in the multi-view image into the cinema image layer (or the first proper subset of visual objects) and the one or more device image layers (or the one or more second proper subsets of visual objects) in the first place.

In some embodiments, the cinema image renderer (106) and/or the device image renderer (108) perform display management operations as a part of rendering (a) the cinema display images and/or (b) the device display images.

The augmented entertainment system as illustrated in FIG. 1 may be used to support real time video applications, near-real-time video applications, non-real-time video applications, virtual reality (VR) applications, augmented reality (AR) applications, remote presence applications, automobile entertainment applications, helmet mounted display applications, heads up display applications, games, 2D display applications, 3D display applications, multi-view display applications, etc. For example, some or all of input image content data (114) can be generated or accessed by the system in real time, in near real time, in non-real time, etc. Example augmented entertainment systems can be found in U.S. Provisional Patent Application No. 62/484,121, with an application title of "LAYERED AUGMENTED ENTERTAINMENT EXPERIENCES" by Ajit Ninan, Neil Mammen and Tyrome Brown, filed on Apr. 11, 2017, the entire contents of which are hereby incorporated by reference as if fully set forth herein.

Techniques as described herein can be used to support rendering and viewing 3D or multi-view images with a wide variety of displays. Example displays (e.g., 104, a device display of a wearable device, etc.) may include, but are not necessarily limited to only, any of: a cinema display, a home theater display, a television, a projection-based display system, a backlight-based display system, a light field based display system, a light waveguide based display system, liquid crystal based display system, light emitting diode based system, organic light emitting diode based system, an image projector, an AR display, a HoloLens display, a Magic Leap display, a Mixed Reality (MR) display, a tensor display, a volumetric display, a light field (LF) display, an Immy display, a Meta display, a relatively simple pair of AR glasses, a display with any in a wide range of capabilities of overcoming the accommodation-vergence conflict, etc.

3. WEARABLE DEVICE

FIG. 2A illustrates an example wearable device (e.g., 102, etc.) that comprises a left view optical stack 202-2, a right view optical stack 202-1, a left view imager 204-2, a right view imager 204-1, etc. Some or all of the components/devices as depicted in FIG. 2A may be implemented by one or more mechanical components, one or more electrooptical components, one or more computing devices, modules, units, etc., in software, hardware, a combination of software and hardware, etc. Some or all of the components/devices as depicted in FIG. 2A may be communicatively (e.g., wirelessly, with wired connections, etc.) coupled with some other components/devices as depicted in FIG. 2A or with other components/devices not depicted in FIG. 2A.

In some embodiments, the wearable device (102) is worn or mounted on the head of the viewer (112). The wearable device (102) may include one or more of: an eyeglasses frame, a face shield, a helmet, a strap attachment, etc. By way of example but not limitation, an eyeglass frame is used to (e.g., removably, irremovably, etc.) fit the left view optical stack (202-2) and the right view optical stack (202-1) in front of the left eye (208-2) and the right eye (208-1) of the viewer (112), respectively. The eyeglass frame is further used to (e.g., removably, irremovably, etc.) attach or mount the left view imager (204-2) and the right view imager (202-1), for example, on a top rim of the eyeglass frame. The eyeglass frame may be personalized to an individual viewer or may be of a generic size designed to be worn or mounted by a relatively large population of viewers (e.g., full size, a size for kids, etc.).

The left view optical stack (202-2) can be used by the viewer (112) of the wearable device (102) to view left view cinema display images rendered on the cinema display (104 of FIG. 1). The right view optical stack (202-1) can be used by the viewer (112) of the wearable device (102) to view right view cinema display images rendered on the cinema display (104). The left view cinema display images as viewed by the viewer (112) through the left view optical stack (202-2) and the right view cinema display images as viewed by the viewer (112) through the right view optical stack (202-1) form stereoscopic cinema images.

The left view imager (204-2) can be used by the viewer (112) to view left view device display images rendered on the device display (116). The right view imager (204-1) can be used by the viewer (112) to view right view device display images rendered on the device display (116). The left view device display images as viewed by the viewer (112) through the left view imager (204-2) and the right view device display images as viewed by the viewer (112) through the right view imager (204-1) form stereoscopic device images complementary to the stereoscopic cinema images.

In some embodiments, the device display (116) is not a physical display, but rather an image plane or a virtual display created by light rays emitted by the left view imager (204-2) and the right view imager (204-1). More specifically, the left view imager (204-2) emits left view light rays that reach the left eye (208-2) of the viewer (112) to allow the viewer (112) to visually perceive or view the left view device display images as if the left view device display images are displayed at the device display (116). Likewise, the right view imager (204-1) emits right view light rays that reach the right eye (208-1) of the viewer (112) to allow the viewer (112) to visually perceive or view the right view device display images as if the right view device display images are displayed at the device display (116).

In some embodiments, the device display (116) may be located at a depth different from or the same as (e.g., in front of the cinema display (104), behind the first display (104), coincide with the cinema display etc.) that of the cinema display (104) in reference to the viewer. As used herein, the term "depth" may refer to a spatial distance between the viewer and an image plane of a display (e.g., cinema display, device display, etc.).

In some embodiments, the device display (116) can display or project device display images at a single image plane of a single distance or at multiple image planes of multiple different distances (e.g., through time-division multiplexing, etc.) in front of the viewer. These distances of the image planes can be fixed or auto tunable. Example device displays with image plane(s) of auto tunable distance(s) from viewers can be found in U.S. Provisional Patent Application No. 62/414,901, with an application title of "EYEWEAR DEVICES WITH FOCUS TUNABLE LENSES," filed on Oct. 31, 2016, the entire contents of which are hereby incorporated by reference as if fully set forth herein.

For example, the left view imager (204-2) and the right view imager (204-1) may operate with lens elements (e.g., with fixed focal lengths, etc.) included in the left view optical stack (202-2) and the right view optical stack (202-1) to project the left view device display images and the right view device display images from an image plan (or the device display (116)) at a fixed depth to the viewer (112). In another non-limiting example, the left view imager (204-2) and the right view imager (204-1) may operate with lens elements (e.g., with fixed focal lengths, with variable focal lengths, etc.) included in the left view optical stack (202-2) and the right view optical stack (202-1) to project the left view device display images and the right view device display images from an image plan (or the device display (116)) at multiple fixed depths to the viewer (112).

In some embodiments, the device image renderer (108) and/or the wearable device (102) can generate a set of time sequential or time synchronous 3D device images from a single 3D device image and depth information (e.g., a depth map, etc.) specifying individual depths of individual visual objects depicted in the single 3D image. The set of time sequential or time synchronous 3D device images may be consecutively or concurrently displayed by the device display (116) at different depths (or multiple device displays or multiple image planes) at different time sub-intervals within an overall image frame interval (or time duration) allocated to displaying the single 3D device image from which the set of time sequential or time synchronous 3D device images is derived.

Additionally, optionally or alternatively, the left view imager (204-2) and the right view imager (204-1) may operate with lens elements (e.g., with variable focal lengths, with tunable focal lengths, etc.) included in the left view optical stack (202-2) and the right view optical stack (202-1) to project the left view device display images and the right view device display images from an image plan (or the device display (116)) at a variable or auto-tunable depth to the viewer (112). Examples of displaying images on image planes at variable depths can be found in the previously mentioned U.S. Provisional Patent Application Ser. No. 62/414,901.

The left view optical stack (202-2) represents an electrooptical stack that allows left view light rays—from the cinema display (104)—used to render the left view cinema display images on the cinema display (104) to reach (or to be transmitted to) the left eye (208-2) of the viewer (112). The right view optical stack (202-1) represents an electrooptical stack that allows right view light rays—from the cinema display (104)—used to render the right view cinema display images on the cinema display (104) to reach (or to be transmitted to) the right eye (208-1) of the viewer (112). At runtime, the left view optical stack (202-2) may be optically transparent to the left view light rays while the left view cinema display images are being rendered on the cinema display (104); and the right view optical stack (202-1) may be optically transparent to the right view light rays while the right view cinema display images are being rendered on the cinema display (104).

An electrooptical stack as described herein may comprise one or more optical and/or electrooptical component layers including but not limited to a combination of one or more of: light transmissive component layers, light reflective component layers, light filtering layers, light modulation layers, micro-prism layers, micro-lens layers, variable or fixed lenses, beam splitters, beam combiners, light engines, switching elements (e.g., transistor-based, etc.) to control levels of light transmittance (or transmissivity) or light reflectance (reflectivity), etc.

Techniques as described herein can be used to support rendering and viewing 3D images with a wide variety of left/right eye separation technologies including but not limited to those based on anaglyph, linear polarization, circular polarization, shutter glasses, spectral spatial separation, etc. Any of the foregoing left/right eye separation technologies may be used in the wearable device (102) to allow light rays used for rendering the left view cinema display images and the right view cinema display images to respectively reach the left eye (208-2) and the right eye (208-1)—or to respectively reach eye vision sweet spots (e.g., foveal vision) spatially separated by an interpupil distance 206—of the viewer (112).

In some embodiments, the left view optical stack (202-2) and the right view optical stack (202-1) may implement anaglyph 3D techniques for viewing the left view cinema display images and the right view cinema display images rendered on the cinema display (104). The left view optical stack (202-2) and the right view optical stack (202-1) provide left/right eye separation by filtering the light (e.g., red light for rendering one image rendered and cyan light for rendering the other image, etc.) through two color filters such as a red filter and a cyan filter.

In some embodiments, the left view optical stack (202-2) and the right view optical stack (202-1) may implement linear polarization 3D techniques for viewing the left view cinema display images and the right view cinema display images rendered on the cinema display (104). The left view optical stack (202-2) and the right view optical stack (202-1) provide left/right eye separation by filtering linearly polarized light (vertically polarized light for rendering one image and horizontally polarized light for rendering the other image) through two orthogonal linear polarizers such as a vertical polarizer and a horizontal polarizer.

In some embodiments, the left view optical stack (202-2) and the right view optical stack (202-1) may implement circular polarization 3D techniques for viewing the left view cinema display images and the right view cinema display images rendered on the cinema display (104). The left view optical stack (202-2) and the right view optical stack (202-1) provide left/right eye separation by filtering circularly polarized light (left-handedly polarized light for rendering one image and right-handedly polarized light for rendering the other image) through two orthogonal circular polarizers such as a left-handed polarizer and a right-handed polarizer.

In some embodiments, the left view optical stack (202-2) and the right view optical stack (202-1) may implement shutter glasses 3D techniques for viewing the left view cinema display images and the right view cinema display images rendered on the cinema display (104). The left view optical stack (202-2) and the right view optical stack (202-1) provide left/right eye separation by left/right eye shuttering (a first image displaying time interval for rendering one image and a second image displaying time interval for rendering the other image) through synchronizing time-multiplexed viewing of left and right eyes with time-multiplexed rendering of respective left and right images.

In some embodiments, the left view optical stack (202-2) and the right view optical stack (202-1) may implement spectral spatial separation 3D techniques for viewing the left view cinema display images and the right view cinema display images rendered on the cinema display (104). The left view optical stack (202-2) and the right view optical stack (202-1) provide left/right eye separation by filtering the light (e.g., a first set of red, green and blue light for rendering one image rendered and a second set of red, green and blue light for rendering the other image where the first set of red, green and blue light is spectrally separated from the second set of red, green and blue light, etc.) through two spectral light filters (e.g., a first filter that passes the first set of red, green and blue light but rejects the second set of red, green and blue light and a second filter that passes the second set of red, green and blue light but rejects the first set of red, green and blue light, etc.).

In various embodiments, the wearable device (102) may use same or different left/right eye separation technologies for rendering the left view device display images and the right view device display images, as compared with those for rendering the left view cinema display images and the right view cinema display images. In an example, the wearable device (102) may comprise spatially separated left and right view imagers (e.g., 204-2 and 204-1, etc.)—for example located apart with approximately the interpupil distance (206)—to project the left view device display images and the right view device display images to the left eye (208-2) and the right eye (208-1), respectively. In another example, the wearable device (102) may comprise a central imager (e.g., mounted on a top bar of the eyeglass frame, etc.) to route or project the left view device display images and the right view device display images to the left eye (208-2) and the right eye (208-1), respectively.

Figure 2B:
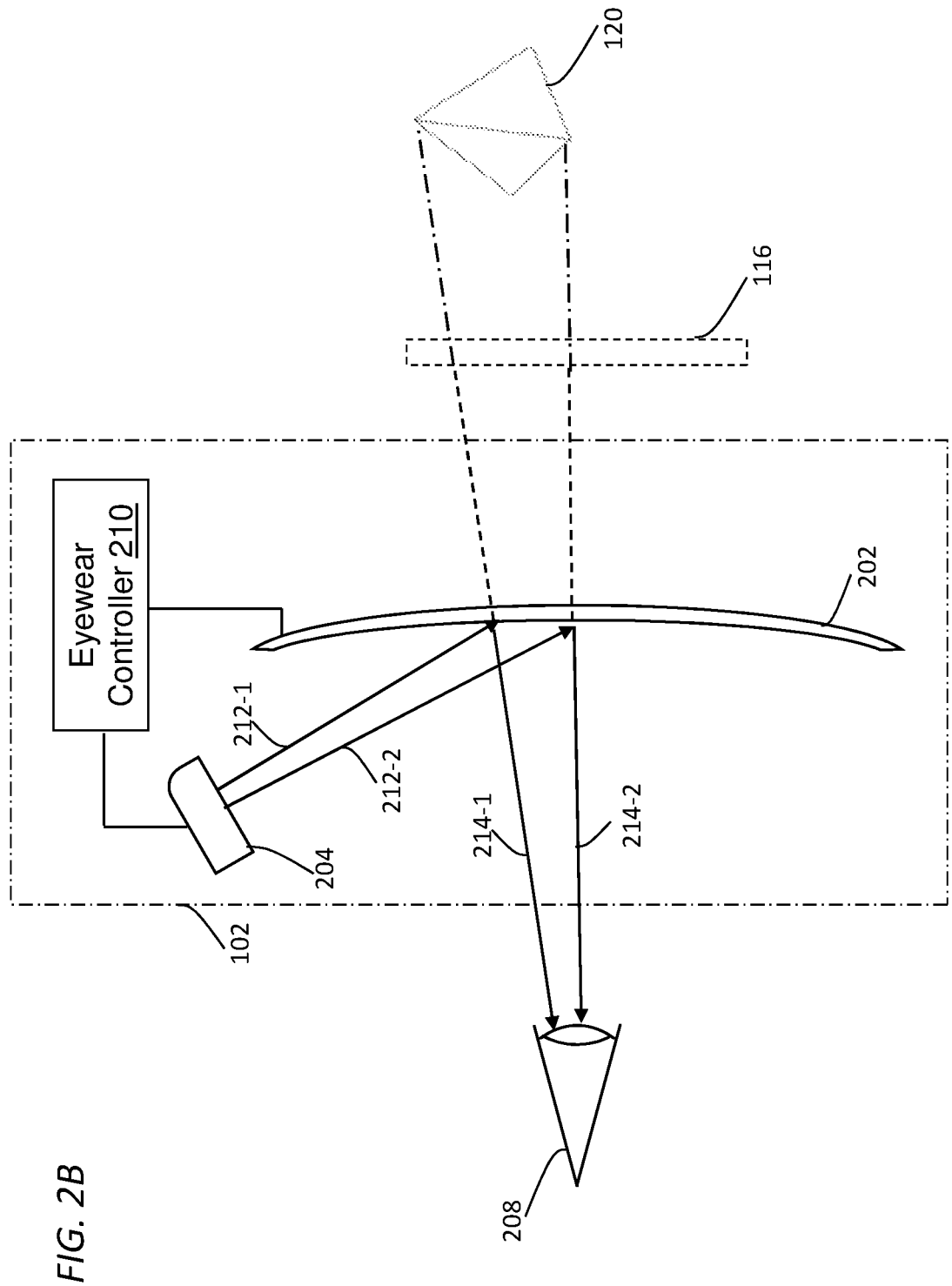
FIG. 2B illustrates an example configuration of a wearable device as related to one of a viewer's eyes.

FIG. 2B illustrates an example configuration of a wearable device (e.g., 102, etc.) as related to a viewer's eye 208. The viewer's eye (208) in FIG. 2B may be one of the left eye (208-2) and the right eye (208-1) of the viewer (112) as shown in FIG. 2A. In some embodiments, the wearable device (102) comprises an imager 204, which may be one of the left view imager (204-2) and the right view imager (204-1) as shown in FIG. 2A.

The imager (204) is for the viewer's eye (208) to view (left or right view) device display images rendered on the device display (116) in addition to cinema display images rendered on the cinema display (104). The device display images for the viewer's eye (208) images and other (right or left view) device display images rendered by another (conjugate) imager on the device display (116) form stereoscopic device display images as visually perceived by the viewer (112).

In some embodiments, the device display (116) is a physical display embedded in an optical stack 202, which may be one of the left view optical stack (202-2) and the right view optical stack (202-1). For example, the imager (204) can cause or control the physical display in the optical stack (202) to emit image rendering light rays (e.g., 214-1, 214-2, etc.) towards the viewer's eye (208).

In some embodiments, the device display is not a physical display, but rather a virtual display. For example, the imager (204) can emit light rays (e.g., 212-1, 212-2, etc.) depicting a visual object (e.g., 120, etc.). These light rays may be redirected by the optical stack (202) into image rendering light rays (e.g., 214-1, 214-2, etc.) towards the viewer's eye (208).

The image rendering light rays (214-1 and 214-2) may be visually perceived by the viewer as coming from the device display images rendered at an image plane, which is represented by the device display (116). In the meantime, other image rendering light rays depicting the same visual object (120) in other device display images rendered at the image plane or the device display (116) by another imager may be visually perceived by the viewer as coming from the other device display images rendered at the device display (116).

The image rendering light rays (214-1 and 214-2) depicting the visual object (120) in the (left or right view) device display images and the other image rendering light rays depicting the same visual object (12) in the other (right or left view) device display images may have positive parallaxes relative to the device display (116) that may represent a zero-parallax surface with respect to the left view device display images and the right view device display images rendered thereon. Thus, the visual object (120) may be visually perceived by the viewer (112) with positive parallax as a 3D object behind the device display (116), even if the visual object (120) may be in front of the cinema display (104) and thus would be rendered with negative parallax on the cinema display (104).

By using the device display (116) to render objects that are (e.g., significantly, well etc.) in front of the cinema display (104), techniques as described herein can avoid or reduce negative parallax in 3D image rendering, thereby preventing or significantly ameliorate physiological discomforts that would be likely generated under other approaches that do not adopt the techniques as described herein.

Under techniques as described herein, the device display (116) can be virtually or physically placed (e.g., significantly, well, etc.) in front of the cinema display (104). In some embodiments, the device display (116) may be a virtual display placed virtually at a relatively comfortable viewing distance (e.g., 1.5 feet, 3 feet, 15 feet, etc.) from the viewer (112). Visual objects, whether are to be depicted as located behind or in front of the cinema display (104), can be rendered with the left view device display images and the right view device display images rendered on the device display (104). As the device display (104) is relatively close to the viewer (112), visual objects of a relatively large depth range can be depicted with positive parallaxes, thereby preventing or significantly ameliorating physiological discomforts that are associated with negative parallaxes.

4. CINEMA AND DEVICE DISPLAY IMAGES

Figure 2C:
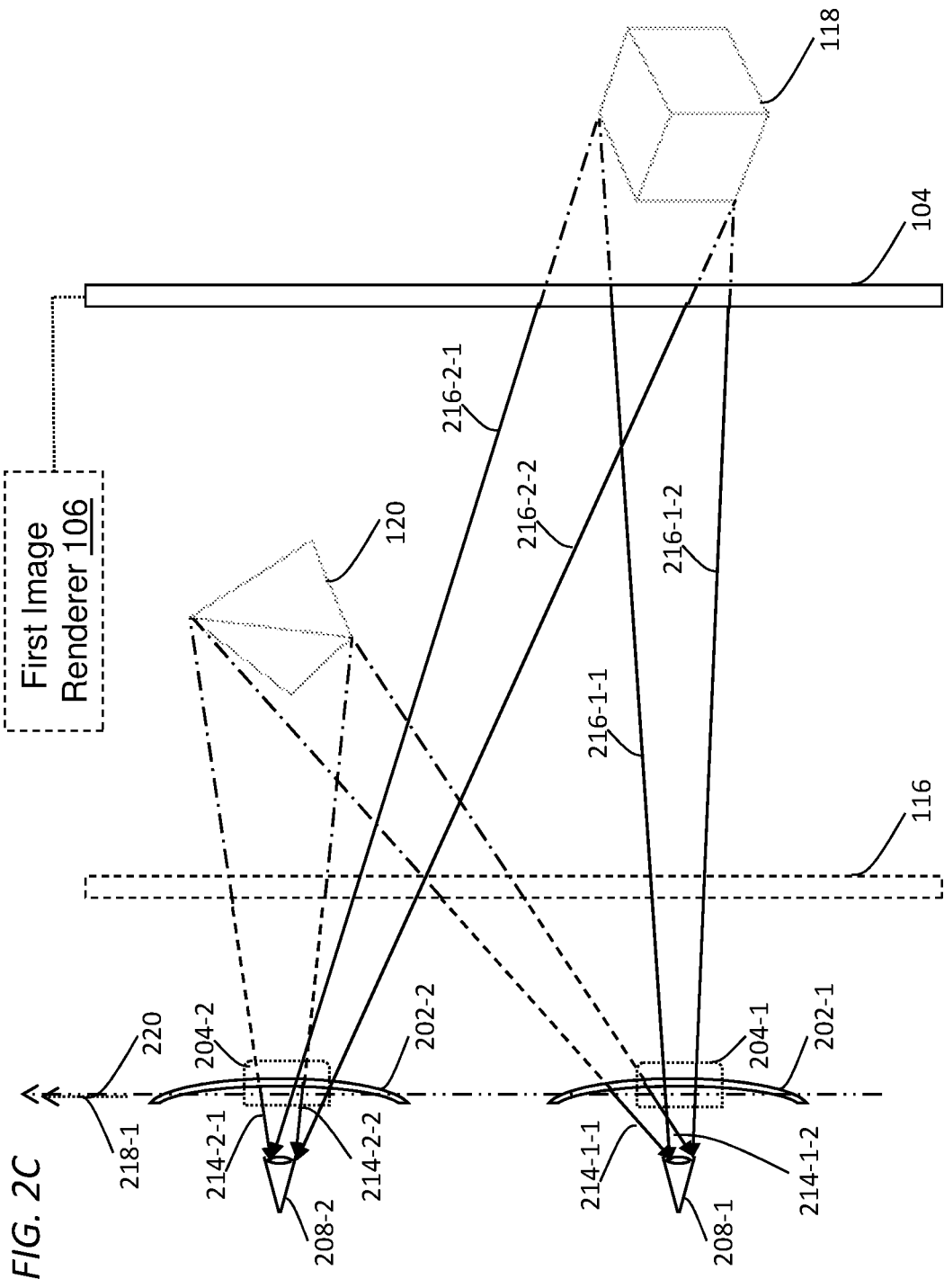
FIG. 2C illustrates an example portion of an augmented entertainment system in relation to a viewer's both eyes.

FIG. 2C illustrates an example portion of an augmented entertainment system as illustrated in FIG. 1 in relation to both of a viewer's left eye (e.g., 208-2, etc.) and right eye (e.g., 208-1, etc.).

In some embodiments, a cinema image renderer (e.g., 106, etc.) in the augmented entertainment system renders (or displays) left view cinema display images and right view cinema display images on a cinema display (e.g., 104, etc.). In some embodiments, the cinema display (104) may be a shared display that renders the cinema display images to a plurality of viewers including but not limited to the viewer (112).

The cinema image renderer (106) causes left view cinema image light rays and right view cinema image light rays to be propagated from the cinema display (104) to the viewer's left eye (208-2) and right eye (208-1). The cinema image light rays may be generated through image projectors, through light engines, through backlight with light modulation layers, through light regeneration layers, etc. The cinema image light rays may depict one or more first visual objects including but not limited to a first visual object (e.g., 118, etc.) located at a spatial location in relation to the cinema display (104).

In some embodiments, all visual objects depicted by the light rays from the cinema display (104), including but not limited to the visual object (118), are behind the cinema display (104). In some embodiments, all visual objects depicted by the light rays from the cinema display (104), including but not limited to the visual object (118), are behind a specific depth threshold (e.g., no more than one meter, no more than two meters, no more than a spatial dimension value set as a relative value to a spatial dimension of the cinema display (104), etc.) in front of the cinema display (104). The depth threshold may be a positive value, zero, or a negative value.

Additionally, optionally or alternatively, a different spatial threshold such as a spatial parallax threshold, a spatial disparity threshold, etc., may be used instead of or in addition to the depth threshold.

In an example, the cinema display (104) represents a zero-parallax plane/surface to the cinema display images rendered on the cinema display (104). Visual objects depicted as located behind the cinema display (104) by the cinema display images are of positive parallaxes. All visual objects depicted by the light rays from the cinema display (104), including but not limited to the visual object (118), are no less than a specific parallax threshold. The parallax threshold may be a positive value, zero, or a negative value.

In another example, the cinema display (104) represents a zero-disparity plane/surface to the cinema display images rendered on the cinema display (104). Visual objects depicted as located behind the cinema display (104) by the cinema display images are of positive disparities. All visual objects depicted by the light rays from the cinema display (104), including but not limited to the visual object (118), are no less than a specific disparity threshold. The disparity threshold may be a positive value, zero, or a negative value.

In some embodiments, the left view cinema display images and the right view cinema display images rendered on the cinema display (104) do not depict a visual object (120) that is determined to be located too far in front of the cinema display (104) or that is determined not to meet one or more of: the depth threshold, the parallax threshold, the disparity threshold, etc.

By way of comparison, the left view cinema display images and the right view cinema display images rendered on the cinema display (104) depict the visual object (118) that is determined to be located not too far in front of the cinema display (104), or that is determined to meet one or more of: the depth threshold, the parallax threshold, the disparity threshold, etc.

The cinema image light rays of different views, as propagated from the cinema display (104), may be spatially separated with a left/right eye separation technology (e.g., anaglyph, linear polarization, circular polarization, synchronized shuttering, spectral separation, etc.) by a left view optical stack (e.g., 202-2) and a right view optical stack (e.g., 202-1) into the viewer's left eye (208-2) and right eye (208-1), respectively.

Left view cinema image light rays (e.g., 216-2-1 and 216-2-2, etc.) are directed to the viewer's left eye (208-2). The left-right eye separation technology implemented by the left view optical stack (202-2) allows the left view cinema image light rays including but not limited to the light rays (216-2-1 and 216-2-2) to be transmitted through the left view optical stack (202-2) to reach the viewer's left eye (208-2). For example, the separation technology causes the left view optical stack (202-2) to be optically transparent to the left view cinema image light rays (e.g., 216-2-1 and 216-2-2, etc.). On the other hand, the separation technology implemented by the right view optical stack (202-1) rejects the left view cinema image light rays (not shown) and prevents the left view cinema image light rays from being transmitted through the right view optical stack (202-1) to the viewer's right eye (208-1). Thus, the separation technology implemented by the right view optical stack (202-1) can cause the right view optical stack (202-1) to be optically opaque to the left view cinema image light rays.

Right view cinema image light rays (e.g., 216-1-1 and 216-1-2, etc.) are directed to the viewer's right eye (208-1). The left-right eye separation technology implemented by the right view optical stack (202-1) allows the right view cinema image light rays including but not limited to the light rays (216-1-1 and 216-1-2) to be transmitted through the right view optical stack (202-2) to reach the viewer's right eye (208-1). For example, the separation technology causes the right view optical stack (202-1) to be optically transparent to the right view cinema image light rays. On the other hand, the separation technology implemented by the left view optical stack (202-2) rejects the right view cinema image light rays (not shown) and prevents the right view cinema image light rays from being transmitted through the left view optical stack (202-2) to the viewer's left eye (208-2). Thus, the separation technology implemented by the left view optical stack (202-2) can cause the left view optical stack (202-2) to be optically opaque to the right view cinema image light rays.

In some embodiments, the left view imager (204-2) in the wearable device (102) renders (or displays) left view device display images on the device display (116) to be seen by the viewer's left eye (208-2) but not the viewer's right eye (208-1). Likewise, the right view imager (204-1) in the wearable device (102) renders (or displays) right view device display images on the device display (116) to be seen by the viewer's right eye (208-1) but not the viewer's left eye (208-2). The left view device display images and the right view device display images form stereoscopic device images to the viewer (112).

To render the left view device display images, the left view imager (204-2) emits light rays depicting a visual object (e.g., 120, etc.) located at a spatial location, for example, in front of the cinema display (104). In some embodiments, the left view cinema display images and the right view cinema display images rendered on the cinema display (104) do not depict the visual object (120).

The light rays emitted by the left view imager (204-2) may be redirected by the left view optical stack (202-2) into left view device image light rays (e.g., 214-2-1, 214-2-2, etc.) towards the viewer's left eye (208-2).

Similarly, to render the right view device display images, the right view imager (204-1) emits light rays depicting the same visual object (120). These light rays may be redirected by the right view optical stack (202-1) into right view device image light rays (e.g., 214-1-1, 214-1-2, etc.) towards the viewer's right eye (208-1).

The device image light rays (214-1-1, 214-1-2, 214-2-1 and 214-2-2) may be visually perceived by the viewer (112) as coming from the left view device display images and the right view device display images rendered at an image plane represented by the device display (116).

The device image light rays (214-1-1, 214-1-2, 214-2-1 and 214-2-2) depict the visual object (120) in the left view device display images and the right view device display images with positive parallaxes relative to the device display (116) that represents a zero-parallax plane. In some embodiments, visual objects (e.g., 120, etc.) depicted with the left view device display images and the right view device display images rendered on the device display (116) are of positive parallaxes. Thus, the visual object (120) may be visually perceived by the viewer (112) as a 3D object located behind the device display (116) in front of the cinema display (104). Additionally, optionally or alternatively, a visual object (not shown) may be depicted in the left view device display images and the right view device display images rendered on the device display (116) as either behind or astride the cinema display (104).

The wearable device (102) may be driven, for example by the viewer (112), to make relative motions in reference to the cinema display (104). These relative motions may comprise any combination of one or more of: linear positions/displacements, rotational positions/displacements, linear velocities/speeds, rotational velocities/speeds, linear accelerations, rotational accelerations, etc.

Spatial position and/or spatial directions of the wearable device (102) over time may be characterized or measured through tracking/monitoring spatial coordinates of a representative spatial position (e.g., a point of symmetry, a central point along the interpupil distance, etc.) and/or a representative spatial direction (e.g., a frontal viewing direction toward the device display (116), etc.) of the wearable device (102) in relation to a reference coordinate system such as a reference Cartesian coordinate system stationary in a 3D space (e.g., a cinema, a home entertainment room, etc.) in which the cinema display (104) is installed.

In some embodiments, the spatial directions of the wearable device (102) may be characterized or measured by spatial coordinates of an angular position/displacement of a device-stationary three-dimensional coordinate system rigidly fixed to or stationary with the wearable device (102). Example device-stationary three-dimensional coordinate systems may be a three-dimensional Cartesian coordinate systems with a positive z-direction corresponding to the viewer's frontal viewing direction, an x-direction parallel to the interpupil distance of the viewer, and a y-direction perpendicular to the x and z directions. Example spatial coordinates of the angular position/displacement may be surge, heave, sway, pitch, yaw, roll, etc.

The specific spatial position and the specific spatial direction of the wearable device (102) may be generally characterized by six spatial dimensions, three of which relate to translations, and the other three of which relate to rotations. In some embodiments, the six spatial dimensions used to characterize of the specific spatial position and the specific spatial direction of the wearable device (102) are fully independent with respect to one another. In these embodiments, the wearable device (102) has six degrees of freedom. However, it is possible that linear or angular positions corresponding to a given degree of freedom may still be limited to a range.

For example, in a movie theater, linear positions of the wearable device (102) along an x-direction (e.g., sways, etc.) in the reference Cartesian coordinate system stationary to the cinema display (104) may be limited to a range corresponding to a fraction of a width of an assigned seat to the viewer (112). Linear positions of the wearable device (102) along an y-direction (heaves) in the Cartesian coordinate system stationary to the cinema display (104) may be limited to a range corresponding to a fraction of the viewer's head. Linear positions of the wearable device (102) along a z-direction (e.g., surges, etc.) in the Cartesian coordinate system stationary to the cinema display (104) may be limited to a range between the back of the seat of the viewer (112) and the back of a seat directly in front of the seat of the viewer (112).

Technique as described herein can be used to support viewing omnidirectional images up to 360 degrees (or up to the entire $4\pi$ solid angle of a sphere). For example, a wearable device as described herein may view direction-specific device display images from any viewing angle up to 360 degrees (or up to the entire $4\pi$ solid angle of a sphere), even though a cinema display on which cinema display images are rendered is fixed or stationary in a 3D space. When viewing away from the cinema display, a viewer of a wearable device may view only the device display images derived from single-layer device images in one or more device image layers. However, in some operational scenarios, angular positions of the wearable device (102) for yaws in reference to the cinema display (104) may be limited to a first range (e.g., +/−20 angular degrees, +/−30 angular degrees, up to +/−180 angular degrees, etc.) of frontal viewing directions. Angular positions of the wearable device (102) for rolls in reference to the cinema display (104) may be limited to a second range (e.g., +/−20 angular degrees, +/−30 angular degrees, up to +/−180 angular degrees, etc.) of frontal viewing directions. Angular positions of the wearable device (102) for pitches in reference to the cinema display (104) may be limited to a third range (e.g., +/−20 angular degrees, +/−30 angular degrees, up to +/−180 angular degrees, etc.) of frontal viewing directions. These angular ranges may be constrained differently. For example, the third range may be set to be relatively small as pitch motions tend to generate relatively serious nauseas and physiological discomforts.

If any of the above-mentioned positional or angular ranges shrinks, or is constrained, to a single value, then a degree of freedom corresponding the single-value positional or angular range is lost or removed from the six degrees of freedom. The wearable device (102) has zero degree of freedom when the wearable device (102) is (e.g., logically, physically, etc.) fixed in translation and in rotation relative to the cinema display (104). The wearable device (102) has one degree of freedom when the wearable device (102) is fixed in rotation but is confined to move along a line or a one-dimensional curve in translation relative to the cinema display (104). Similarly, the wearable device (102) has one degree of freedom when the wearable device (102) is fixed in translation but is confined to rotate in a single rotational direction relative to the cinema display (104).

In some embodiments, a device tracker monitors spatial positions and spatial directions of the wearable device (102). In some embodiments, the wearable device (102) has light sources removably or irremovably attached to, or otherwise installed on, the wearable device (102). These light sources may emit or reflect off light rays such as light rays of visible light wavelengths, light rays of invisible light wavelengths, infrared lights, etc. Examples of light sources may include, but are not necessarily limited to only, any of: light emitters, light emitting diodes (LEDs), non-LED lights, light regenerators, light reflectors, light scattering devices, retroreflectors, etc. By way of example but not limitation, light sources on the wearable device (102) emit or reflect off invisible light such as infrared light, etc., for device tracking purposes.

In some embodiments, the device tracker generates device tracking images that capture light rays from light sources placed on the wearable devices including but not limited to the wearable device (102). These light rays may be captured continuously, at a set time schedule, etc. For example, the device tracking images may be taken at a time resolution of a millisecond or a fraction of millisecond, at a time resolution of every hundredth second, at a time resolution of every tenth second, etc.

In some embodiments, the device tracker tracks or determines spatial positions and spatial directions of the wearable device (102) at a given time point (e.g., over a time interval, over the entire time duration of a 3D movie, etc.) based on one or more device tracking images captured at the given time point from light rays from light sources of the wearable device (102). Example device tracking can be found in U.S. Provisional Patent Application No. 62/484,131, with an application title of "PASSIVE MULTI-WEARABLE-DEVICES TRACKING" by Ajit Ninan and Neil Mammen, filed on Apr. 11, 2017, the entire contents of which are hereby incorporated by reference as if fully set forth herein.

In some embodiments, the device image renderer (108) receives, from the device tracker, spatial positions and spatial directions of the wearable device (102) over time (e.g., over a time interval, over the entire time duration of a 3D movie, etc.). Based on the spatial positions and spatial directions of the wearable device (102), the device image renderer (108) can determine spatial relationships between the wearable device (102) and the cinema display (104). In some embodiment, these spatial relationships may be represented by one or more of: linear positions/displacements, angular positions/displacements, linear or angular velocities, linear or angular speeds, linear or angular accelerations, etc., of the wearable device (102) in relation to the cinema display (104) or the reference Cartesian coordinate system.

For example, based on single-layer device images derived from one or more device image layers of a received multi-view multi-layer video signal, the device image renderer (108) can determine one or more 3D device images comprising one or more left view device images and one or more right view device images. The device image renderer (108) or the wearable device (102) may perform a spatial transformation on the one or more left view device images and the one or more right view device images (in the one or more 3D device images)—before rendering them—based on the spatial relationships between the wearable device (102) and the cinema display (104).

Based on the left view device images and the right view device images as transformed by the spatial transformation, the device image renderer (108) can cause the wearable device (102) to render these left view device images and right view device images on the device display (116). The device image renderer (108) can communicate control information, status information, positional data, image data such as the device images, metadata, etc., with the wearable device (102) over one or more data connections. Example data connections may include, but are not limited, wireless data connections, wired data connections, radio-frequency based data connections, cellular data connections, Wi-Fi data connections, infrared-based data connections, data connections over HDMI cable, data connections over optical cable, data connections over High-Speed Serial Interface (HSSI), High-Definition Serial Digital Interface (HD-SDI), 12G-SDI, USB cable, and the like to seat/armrest/floor, etc.

Additionally, optionally, or alternatively, some or all of image processing operations such as image rotation determination, image alignment analysis, scene cut detections, transformation between coordinate systems, temporal dampening, display management, content mapping, color mapping, field-of-view management, etc., may be performed as part of rendering cinema display images and/or device display images as described herein.

5. RELATIVE MOTIONS BETWEEN DEVICE DISPLAY AND CINEMA DISPLAY

Figure 2D:
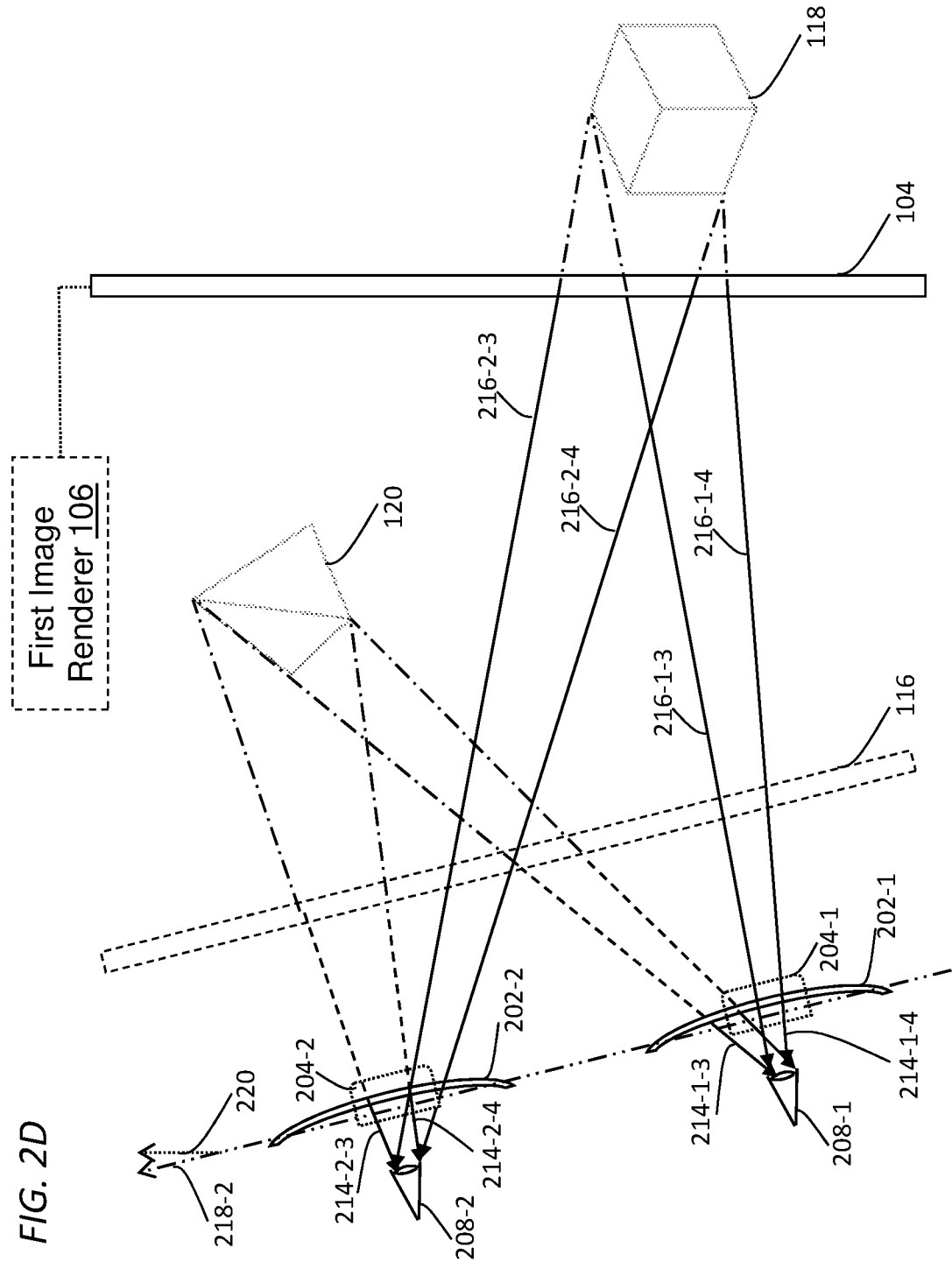
FIG. 2D illustrates an example portion of an augmented entertainment system in which the wearable device makes a relative motion with respect to the cinema display.

FIG. 2D illustrates an example portion of an augmented entertainment system in which the wearable device (102) makes a relative motion with respect to the cinema display (104).

The wearable device (102) as illustrated in FIG. 2C may have a specific spatial position and a first specific spatial direction in reference to the cinema display (104) in a 3D space such as a movie theater, a home entertainment space, a venue, etc. For example, the first specific spatial direction of the wearable device (102) may be characterized, among other things, by a first device-specific spatial direction 218-1. The first device-specific spatial direction (218-1) may represent a planar direction, a transverse direction, etc., of the wearable device (102) at a first time point. The first device-specific spatial direction (218-1) happens to coincide or parallel with a reference spatial direction 220. The reference spatial direction (220) may represent a planar direction, a transverse direction, etc., of the cinema display (104).

By way of comparison, the wearable device (102) as illustrated in FIG. 2D may have the same specific spatial position but a second different specific spatial direction in reference to the cinema display (104). For example, the second specific spatial direction of the wearable device (102) may be characterized, among other things, by a second device-specific spatial direction 218-2. The second device-specific spatial direction (218-2) may represent a planar direction, a transverse direction, etc., of the wearable device (102) at a second time point (e.g., subsequent to the first time point, immediately following the first time point, etc.). The second device-specific spatial direction (218-2) happens to tilt or incline with the reference spatial direction (220) by forming a non-zero angle (or a non-zero rotational displacement) with the reference spatial direction (220).

For the purpose of illustration, the cinema image renderer (106) continues to render (or displays) the left view cinema display images and the right view cinema display images on the cinema display (104), for example regardless of which spatial position and/or specific direction to which the wearable device (102) is moved. The cinema display images depict the first visual object (118) located at the same spatial location as in FIG. 2C in relation to the cinema display (104).

Left view cinema image light rays and right view cinema image light rays used to render the left view cinema display images and the right view cinema display images, as propagated from the cinema display (104), may be spatially separated with the left/right eye separation technology (e.g., anaglyph, linear polarization, circular polarization, synchronized shuttering, spectral separation, etc.) implemented by the left view optical stack (202-2) and the right view optical stack (202-1) into the viewer's left eye (208-2) and right eye (208-1), respectively.

The left view cinema image light rays comprise light rays 216-2-3 and 216-2-4 that are directed to the viewer's left eye (208-2). The left-right eye separation technology implemented by the left view optical stack (202-2) allows the left view cinema image light rays including but not limited to the light rays (216-2-3 and 216-2-4) to be transmitted through the left view optical stack (202-2) to reach the viewer's left eye (208-2). For example, the separation technology causes the left view optical stack (202-2) to be optically transparent to the left view cinema image light rays. On the other hand, the left-right eye separation technology implemented by the right view optical stack (202-1) rejects the left view cinema image light rays (not shown) and prevents the left view cinema image light rays from being transmitted through the right view optical stack (202-1) to the viewer's right eye (208-1). The separation technology causes the right view optical stack (202-1) to be optically opaque to the left view cinema image light rays.

The right view cinema image light rays comprise light rays 216-1-3 and 216-1-4 that are directed to the viewer's right eye (208-1). The left-right eye separation technology implemented by the right view optical stack (202-1) allows the right view cinema image light rays including but not limited to the light rays (216-1-3 and 216-1-4) to be transmitted through the right view optical stack (202-2) to reach the viewer's right eye (208-1). For example, the separation technology causes the right view optical stack (202-1) to be optically transparent to the right view cinema image light rays. On the other hand, the left-right eye separation technology implemented by the left view optical stack (202-2) rejects the right view cinema image light rays (not shown) and prevents the right view cinema image light rays from being transmitted through the left view optical stack (202-2) to the viewer's left eye (208-2). The separation technology causes the left view optical stack (202-2) to be optically opaque to the right view cinema image light rays.

In some embodiments, the left view imager (204-2) renders (or displays) the left view device display images on the device display (116) to be seen by the viewer's left eye (208-2) but not the viewer's right eye (208-1). Likewise, the right view imager (204-1) renders (or displays) right view device display images on the device display (116) to be seen by the viewer's right eye (208-1) but not the viewer's left eye (208-2). The left view device display images and the right view device display images form stereoscopic device images as visually perceived by the viewer (112). As illustrated in FIG. 2D, the device display (116) is tilted relative to the cinema display (104), for example, by the angle (or angular displacement) between the second device-specific spatial direction (218-2) and the reference spatial direction (220).

In some embodiments, relative movements of the wearable device (102), or relative movements of the device display (116), in relation to the cinema display (104) do not cause changes in spatial relationships between or among visual objects that were depicted by the multi-view images from which the cinema display images and the device display images are derived.

For example, the device image renderer (108) or the wearable device (102) may perform a spatial transformation on the left view device display images and the right view device display images—before rendering them on the device display (116)—in response to determining that the wearable device (102) has changed from the first device-specific spatial direction (218-1) to the second device-specific spatial direction (218-2). The left view device display images and the right view device display images as transformed by the spatial transformation depict the visual object (120) at the same location as in FIG. 2C in relation to the cinema display (104), if the visual object (120) has not moved from the first time point of FIG. 2C to the second time point of FIG. 2D as depicted by the multi-view images.

In some embodiments, multiple image planes/surfaces may be generated for the device display (116) by the wearable device (102). When the viewer's frontal viewing direction is toward the center of the cinema display (104), the image planes/surfaces may be (e.g., evenly, with increased depth steps in between, with decreased depth steps in between, etc.) spaced between the viewer (112) and the cinema display (104) at various depths. These multiple image planes may be used to remove or reduce negative parallaxes in collective 3D images formed by the cinema display images and the device display images rendered on the cinema display (104) and the device display (112), as visually perceived by the viewer (112).

It has been described that the left view device display images and the right view device display images may be rendered at the same device display. This is for illustration purposes only. In some embodiments, the left view device display images may be rendered at a second left display, whereas the right view device display images may be rendered at a second right display; the second left display and the second right display may or may not be (e.g., completely, etc.) coinciding with each other, so long as the visual objects are depicted with image rendering light rays based on correct parallaxes in consistency with visual object depth information in the input image content (114).

6. SPECTRAL SPATIAL SEPARATION

Figure 3A:
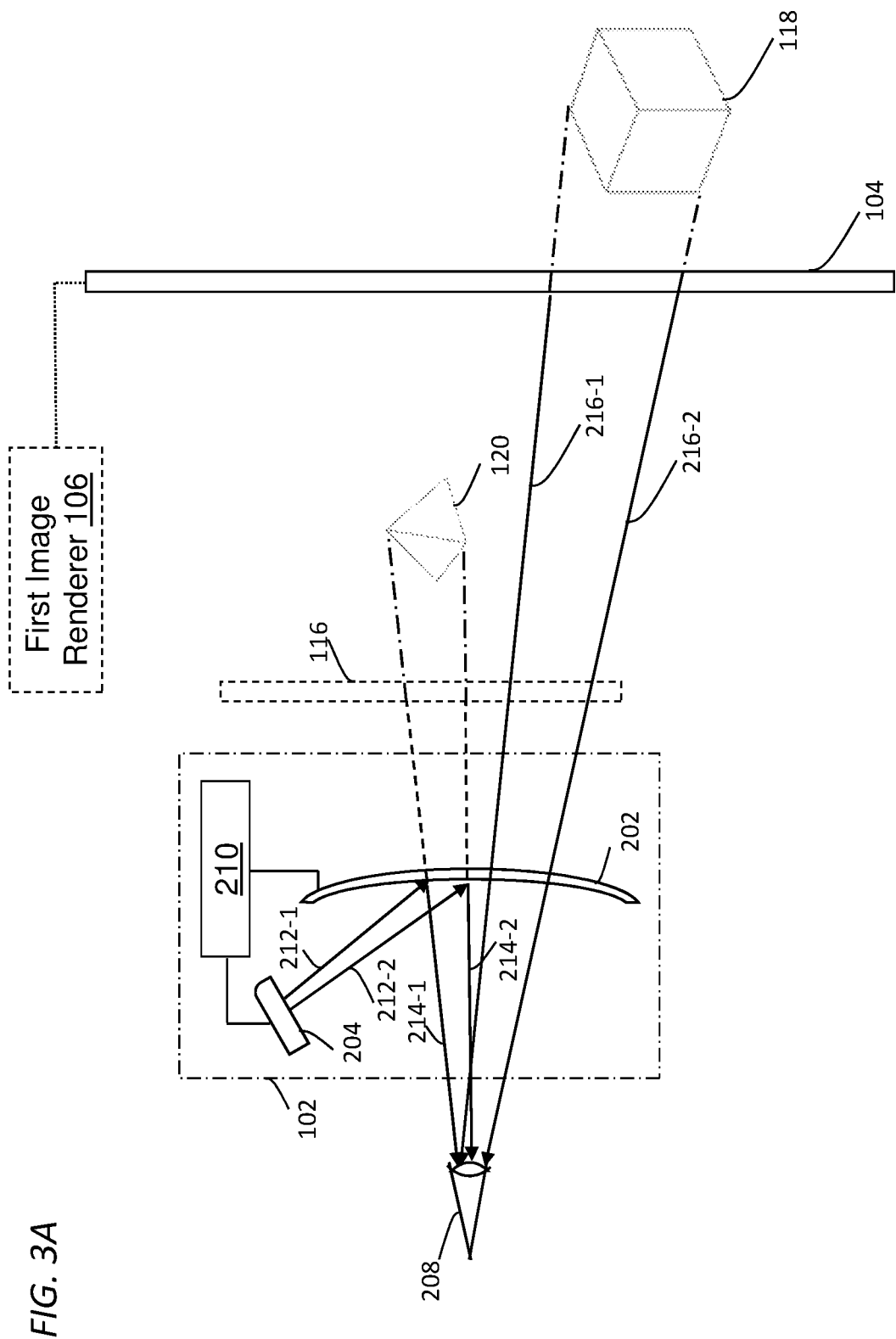
FIGS. 3A, 3B, 3C and 3D illustrate example configurations of wearable devices.

FIG. 3A illustrates an example configuration of a wearable device (e.g., 102, etc.) as related to one of the eyes of the viewer (112). The eye (208) of the viewer (112) in FIG. 3A represents either the left eye (208-2) or the right eye (208-1) of the viewer (112).

In some embodiments, the wearable device (e.g., 102, etc.) comprises an optical stack (e.g., 202, etc.) that separates left view cinema display images from right view cinema display images rendered on a cinema display (e.g., 104, etc.), and at the same time to redirect light rays that render device display images into the viewer's eye (208) with minimal light loss.

In some embodiments, the optical stack (202) comprises spectral filters that are transparent to a specific set of passbands of light wavelengths. In some embodiments, the specific set of passbands of light wavelengths comprises a set of primary colors (e.g., red, green and blue, etc.). The spectral filters can be implemented with any of: dichroic filters, interference filters, band-pass filters, and the like.

In cases where the optical stack (202) represents a right view optical stack (e.g., 202-1 of FIG. 2A, etc.) for the viewer's right eye (208-1 of FIG. 2A), the right view optical stack (202, 202-1 of FIG. 2A) can be made (e.g., attached, installed, assembled, fitted into the eyeglass frame, etc.) beforehand to comprise right view spectral filters that are transparent to primary colors (e.g., red color 1, green color 1 and blue color 1, etc.) in (e.g., a set of, etc.) first passbands of light wavelengths. The first passbands of light wavelengths represent right-view passbands of light wavelengths. The right view spectral filters in the optical stack (202), while being transparent to the primary colors in the first passbands of light wavelengths, are (e.g., completely, with minimal optical loss, etc.) reflective to the primary colors in the second passbands of light wavelengths.

In some embodiments, the first passbands of light wavelengths have no or little light wavelength overlapping with the second passbands of light wavelengths. A guard gap in light wavelength may be used to separate a passband of the first passbands from any neighboring passband of the second passbands.

When the left view cinema image light rays and the right view cinema image light rays are propagated from the cinema display (104) to the optical stack (202) before reaching the viewer's right eye (208-1), the right view spectral filters in the optical stack (202) allows the right view cinema image light rays in the first passbands of light wavelengths to be transmitted to the viewer's right eye (208-1) but reflects/rejects the left view cinema image light rays in the second passbands thereby disallowing the left view cinema image light rays to be transmitted to the viewer's right eye (208-1), as the right view spectral filters are reflective to the primary colors in the second passbands of light wavelengths but transparent to the primary colors in the first passbands of light wavelengths.

As a result, the right view cinema display images rendered with the right view cinema image light rays (comprising the primary colors) in the first passbands of light wavelengths are visible to the viewer's right eye (208-1), but invisible to the viewer's left eye (208-2).

In cases where the optical stack (202) represents a left view optical stack (e.g., 202-2 of FIG. 2A, etc.) for the viewer's left eye (208-2 of FIG. 2A), the left view optical stack (202, 202-2 of FIG. 2A) can be made (e.g., attached, installed, assembled, fitted into the eyeglass frame, etc.) beforehand to comprise left view spectral filters that are transparent to primary colors (e.g., red color 2, green color 2 and blue color 2, etc.) in (e.g., a set of, etc.) second passbands of light wavelengths. The second passbands of light wavelengths represent left-view passbands of light wavelengths. The left view spectral filters in the optical stack (202), while being transparent to the primary colors in the second passbands of light wavelengths, are (e.g., completely, with minimal optical loss, etc.) reflective to the primary colors in the first passbands of light wavelengths.

When the left view cinema image light rays and the right view cinema image light rays are propagated from the cinema display (104) to the optical stack (202) before reaching the viewer's left eye (208-2), the left view spectral filters in the optical stack (202) allows the left view cinema image light rays in the second passbands to be transmitted to the viewer's left eye (208-2) but reflects/rejects the right view cinema image light rays in the first passbands, thereby disallowing the right view cinema image light rays to be transmitted to the viewer's left eye (208-2), because the left view spectral filters are reflective to the primary colors in the first passbands of light wavelengths but transparent to the primary colors in the second passbands of light wavelengths.

As a result, the left view cinema display images rendered with the left view cinema image light rays in the second passbands are visible to the viewer's left eye (208-2), but invisible to the viewer's right eye (208-1).

In some embodiments, the wearable device (102) comprises the left view imager (204-2) and the right view imager (204-1) as shown in FIG. 2A.

In cases where the optical stack (202) represents the right view optical stack (202-1 of FIG. 2A), the imager (204) emits the light rays (e.g., 212-1, 212-2, etc.) that comprise the primary colors in the second passbands of light wavelengths; the primary colors (or the light rays) in the second passbands of light wavelengths are further reflected by the right view optical stack (202-1) into the viewer's right eye (208-1), because the right view optical stack (202-1) comprises the right view spectral filters that are (e.g., completely, with minimal light loss, etc.) reflective to the second passbands of light wavelengths.

In cases where the optical stack (202) represents the left view optical stack (202-2 of FIG. 2A), then the imager (204) emits the light rays (e.g., 212-1, 212-2, etc.) that comprise the primary colors in the first passbands of light wavelengths; the primary colors (or the light rays) in the first passbands of light wavelengths are further reflected by the left view optical stack (202-2) into the viewer's left eye (208-2), because the left view optical stack (202-2) comprises the left view spectral filters that are (e.g., completely, with minimal light loss, etc.) reflective to the first passbands of light wavelengths.

Techniques as described herein can be used to implement a wearable device (e.g., 102 of FIG. 1 or FIG. 2A, etc.) in a wide variety of system configuration. Some or all of the wearable device may represent a head-mounted display device, a wearable device, a 3D glasses, etc. Some or all of the wearable device may represent a single device, or multiple devices operating cooperatively.

In some embodiments, some or all of an augmented entertainment system such as the device image renderer (108) of FIG. 1, etc., may be implemented as a part of the wearable device (102), or one or more separate devices operating in conjunction with the wearable device (102).

Additionally, optionally or alternatively, some or all of the wearable device (102) such as some or all of an imager (e.g., 204-1 or 204-2 of FIG. 2A, 204 of FIG. 3A, etc.), etc., may be separated from a wearable device, a head-mounted display device, etc., that comprises optical stacks for left/right eye separation.

It has been depicted that a wearable device comprises two imagers, respectively for two eyes of a viewer. It should be noted that this is for illustration only. In various embodiments, same, more or fewer imagers may be used. For example, in some embodiments, a single imager may be used to generate second image rendering light rays that have separate optical paths (e.g., beam splitters, optical mirrors, optical prisms, optical lenses, light waveguides, etc.) respectively leading to the two eyes of the viewer.

7. EXAMPLES OF OPTICAL STACKS

Figure 3B:
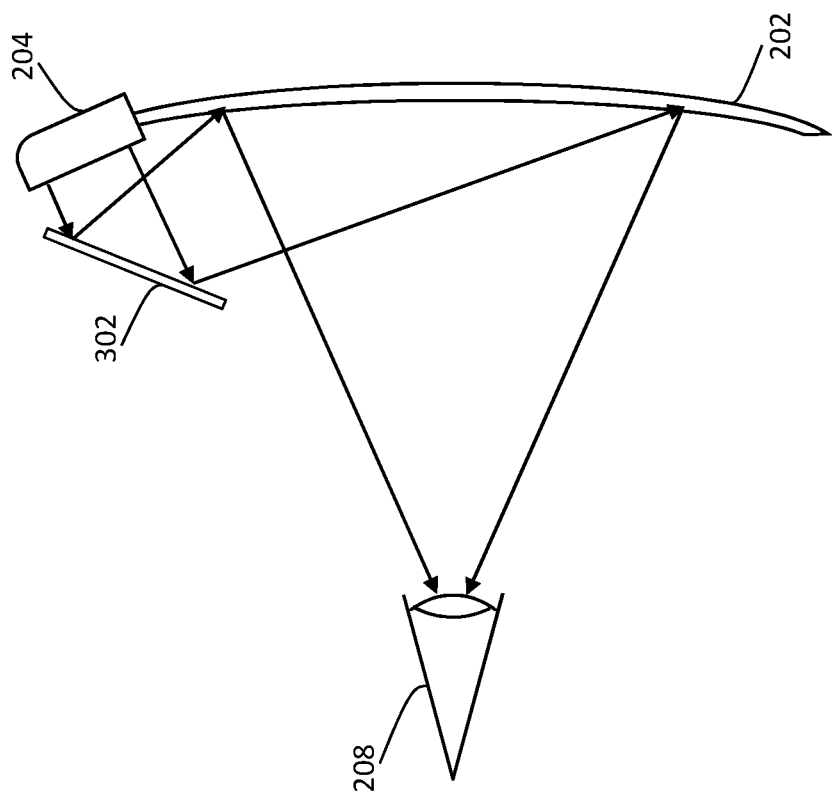
Figure 3C:
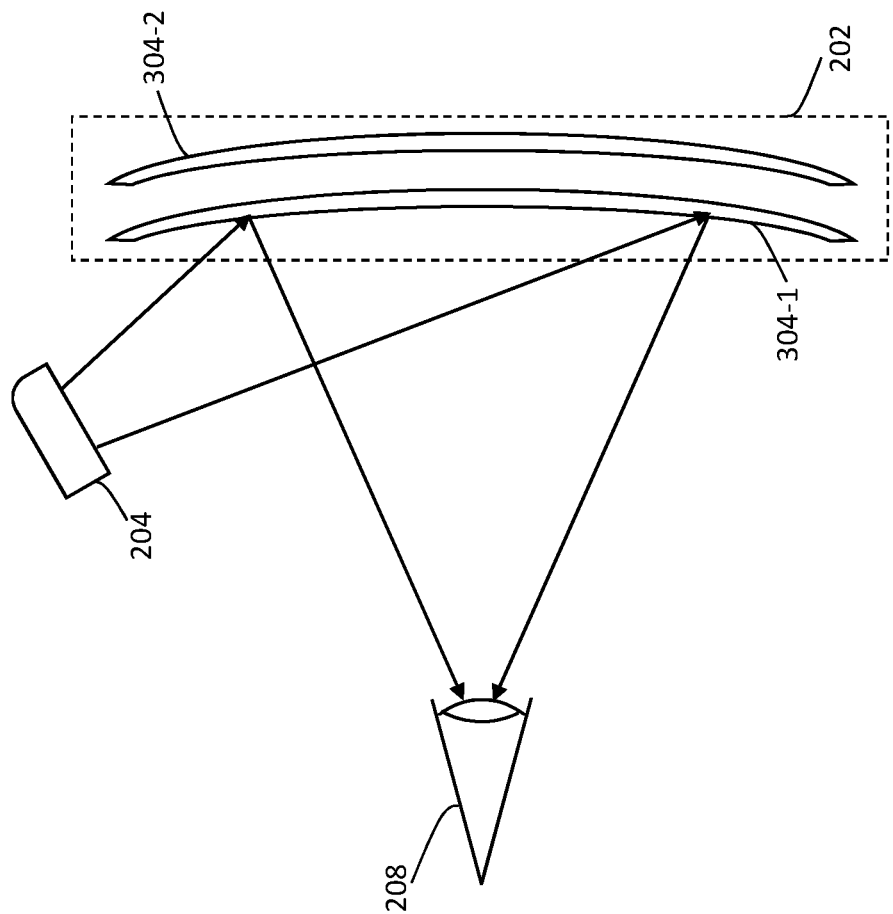
Figure 3D:
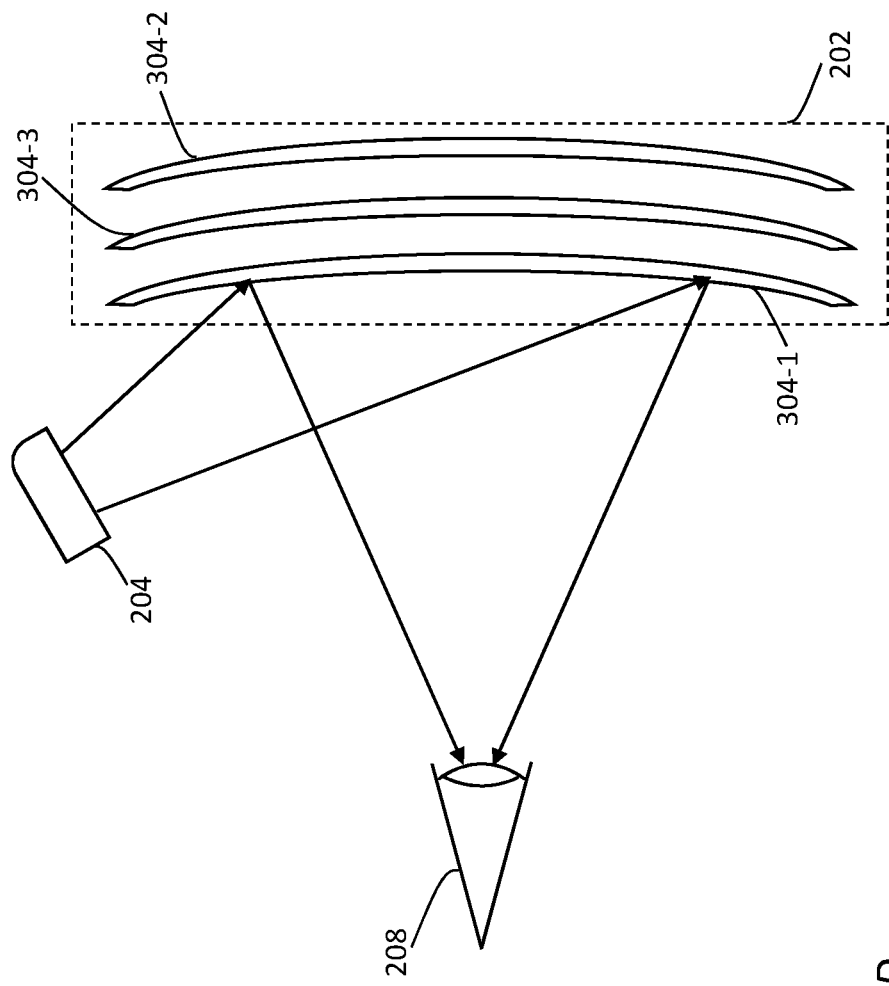

FIG. 3B through FIG. 3D illustrates some example configurations of a wearable device (e.g., 102, etc.). As illustrated in FIG. 3B, instead of using an imager (e.g., 204, etc.) to emit light rays directly onto an optical stack (e.g., 202, etc.) as shown in FIG. 2B, a light reflector 302 may be used to reflect or redirect the light rays emitted by the imager (204) onto the optical stack (202), which further reflects or redirects incoming light rays into image rendering light rays visible to the viewer's eye (208).

As illustrated in FIG. 3C and FIG. 3D, the optical stack (202) may comprise a multi-layer structure. For example, as shown in FIG. 3C, the multi-layer structure may comprise a dedicated reflective layer 304-1 to reflect or redirect incoming light rays, which is emitted by or redirected from light rays emitted by, the imager (204), to outgoing image rendering light rays visible to the viewer's eye (208). Additionally, optionally or alternatively, the multi-layer structure of the optical stack (202) may comprise a dedicated left/right eye separation layer 304-2 to filter light rays coming from a cinema display (not shown) to the right of FIG. 3C in front of the viewer and the optical stack (202). Switching elements may be implemented to control individual transmittance and opacity of each pixel in the plurality of pixel. In some embodiments, the imager (204) or a device (e.g., the device image renderer (108), etc.) operating in conjunction with the imager (204) may implement an occlusion algorithm that generates an image mask (e.g., a different image mask for each of the two eyes; the same image mask for both eyes, etc.) for disocclusion and/or for occlusion based on images that are to be rendered by the imager (204).

For example, in response to determining that the images rendered by the imager (204) depict a visual object (e.g., 120, etc.) that is opaque, pixels in the plurality of pixels corresponding to the visual object (120) may be identified and controlled to be set to be opaque (e.g., the highest opacity, the lowest transmittance, etc.) in order to block light rays emitted or reflected off from a specific area of the cinema display (104), where the specific area is deemed to be behind and hence blocked by the visual object (120). This may be used to increase local contrasts or to reduce color shifts for the visual object as depicted in the images rendered by the imager.

8. EXAMPLE PROCESS FLOWS

Figure 4:
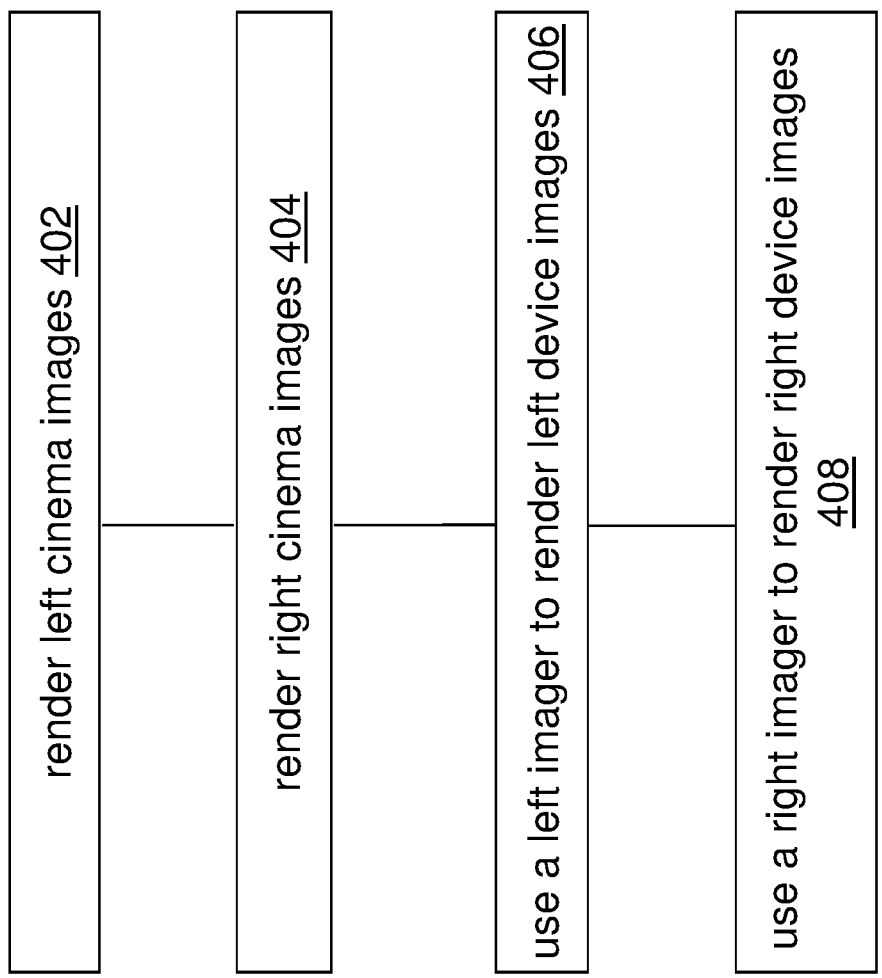
FIG. 4 illustrates example process flows.

FIG. 4 illustrates an example process flow according to an example embodiment of the present invention. In some example embodiments, one or more computing devices or components may perform this process flow. In block 402, an augmented entertainment system renders left view cinema display images for a viewer of a wearable device to view through a left view optical stack of the wearable device.

In block 404, the augmented entertainment system renders right view cinema display images for the viewer to view through a right view optical stack of the wearable device. The left view cinema display images as viewed by the viewer through the left view optical stack and the right view cinema display images as viewed by the viewer through the right view optical stack form stereoscopic cinema images.

In block 406, the augmented entertainment system uses a left view imager of the wearable device to render left view device display images, to the viewer, on a device display of the wearable device;

In block 408, the augmented entertainment system uses a right view imager of the wearable device to render right view device display images, to the viewer, on the device display. The left view device display images as viewed by the viewer through the left view imager and the right view device display images as viewed by the viewer through the right view imager form stereoscopic device images complementary to the stereoscopic cinema images.

In an embodiment, the augmented entertain system is further configured to: rendering the left view device display images by emitting light rays from the left view imager; rendering the right view device display images by emitting light rays from the right view imager.

In an embodiment, the device display represents a virtual display.

In an embodiment, the device display represents a physical display.

In an embodiment, the left view device display images and the right view device display images are rendered on the device display at a single image plane.

In an embodiment, the left view device display images and the right view device display images are rendered on the device display at multiple image planes.

In an embodiment, the left view cinema display images and the right view cinema display images, as rendered on the cinema display, are separated by the left view optical stack and the right view optical stack based on light polarization states.

In an embodiment, the left view cinema display images and the right view device display images, as rendered on the cinema display, are separated by the left view optical stack and the right view optical stack based on a shutter-based mechanism.

In an embodiment, the left view cinema display images and the right view device display images, as rendered on the cinema display, are separated by the left view optical stack and the right view optical stack based on light polarization.

In an embodiment, the left view cinema display images and the right view device display images, as rendered on the cinema display, are separated by the left view optical stack and the right view optical stack based on spectral spatial separation.

In an embodiment, the left view optical stack comprises a left dichroic layer that is transparent for a first set of light wavelengths and that is opaque and reflective for a second set of light wavelengths spectrally separated from the first set of light wavelengths; the left view images are rendered with the first set of light wavelengths; left view light rays with the second set of light wavelengths are emitted by the left view imager onto the left dichroic layer and are reflected by the left dichroic layer toward the viewer's left eye for rendering the left view device display images.

In an embodiment, the right view optical stack comprises a right dichroic layer that is transparent for the second set of light wavelengths and that is opaque and reflective for the first set of light wavelengths; the right view images are rendered with the second set of light wavelengths; right view light rays with the first set of light wavelengths are emitted by the right view imager onto the right dichroic layer and are reflected by the right dichroic layer toward the viewer's right eye for rendering the right view device display images.

In an embodiment, spatial coordinates of the wearable device are monitored in real time or in near real time.

In an embodiment, the left view device display images and the right view device display images are generated to be rendered based on one or more spatial transformations that are dependent on the spatial coordinates of the wearable device.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

9. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
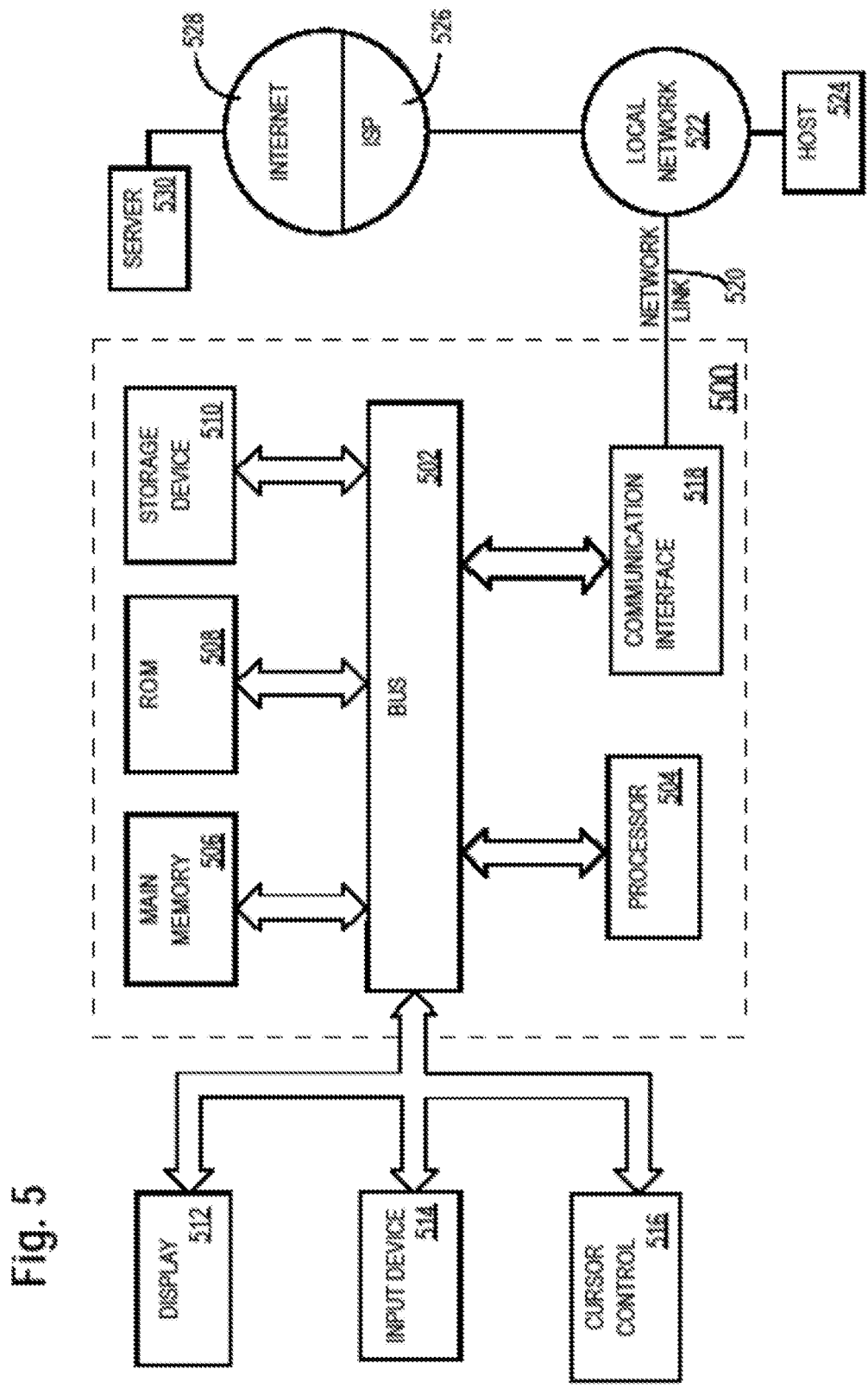
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer viewer. An input device 514, including alphanumeric and other keys, is coupled to bus 502 for communicating information and command selections to processor 504. Another type of viewer input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams.

The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

10. EQUIVALENTS, EXTENSIONS, ALTERNATIVES AND MISCELLANEOUS

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A wearable device, comprising:
   a left view optical stack for a viewer of the wearable device to view left view cinema display images rendered on a cinema display;
   a right view optical stack for the viewer to view right view cinema display images rendered on the cinema display;
   wherein the left view cinema display images as viewed by the viewer through the left view optical stack and the right view cinema display images as viewed by the viewer through the right view optical stack form stereoscopic cinema images;
   a left view imager that renders left view device display images, to the viewer, on a device display of the wearable device;
   a right view imager that renders right view device display images, to the viewer, on the device display of the wearable device;
   wherein the left view device display images as viewed by the viewer through the left view imager and the right view device display images as viewed by the viewer through the right view imager form stereoscopic device images complementary to the stereoscopic cinema images;
   wherein the stereoscopic cinema images are derived from multi-view images from which the device display images are derived.

2. The wearable device of claim 1, wherein the device display renders the left view device display images by emitting light rays from the left view imager and the right view device display images by emitting light rays from the right view imager.

3. The wearable device of claim 1, wherein the device display represents a virtual display.

4. The wearable device of claim 1, wherein the device display represents a physical display.

5. The wearable device of claim 1, wherein the device display renders the left view device display images and the right view device display images at a single image plane.

6. The wearable device of claim 1, wherein the device display renders the left view device display images and the right view device display images at multiple image planes.

7. The wearable device of claim 1, wherein the left view cinema display images and the right view cinema display images, as rendered on the cinema display, are separated by the left view optical stack and the right view optical stack based on light polarization states.

8. The wearable device of claim 1, wherein the left view cinema display images and the right view cinema display images, as rendered on the cinema display, are separated by the left view optical stack and the right view optical stack based on a shutter-based mechanism.

9. The wearable device of claim 1, wherein the left view cinema display images and the right view cinema display images, as rendered on the cinema display, are separated by the left view optical stack and the right view optical stack based on light polarization.

10. The wearable device of claim 1, wherein the left view cinema display images and the right view cinema display images, as rendered on the cinema display, are separated by the left view optical stack and the right view optical stack based on spectral spatial separation.

11. The wearable device of claim 1, wherein the left view optical stack comprises a left dichroic layer that is transparent for a first set of light wavelengths and that is opaque and reflective for a second set of light wavelengths spectrally separated from the first set of light wavelengths; wherein the left view images are rendered with the first set of light wavelengths; and wherein left view light rays with the second set of light wavelengths are emitted by the left view imager onto the left dichroic layer and are reflected by the left dichroic layer toward the viewer's left eye for rendering the left view device display images.

12. A method, comprising:
   rendering left view cinema display images for a viewer of a wearable device to view through a left view optical stack of the wearable device;
   rendering right view cinema display images for the viewer to view through a right view optical stack of the wearable device;
   wherein the left view cinema display images as viewed by the viewer through the left view optical stack and the right view cinema display images as viewed by the viewer through the right view optical stack form stereoscopic cinema images;
   using a left view imager of the wearable device to render left view device display images, to the viewer, on a device display of the wearable device;
   using a right view imager of the wearable device to render right view device display images, to the viewer, on the device display;
   wherein the left view device display images as viewed by the viewer through the left view imager and the right view device display images as viewed by the viewer through the right view imager form stereoscopic device images complementary to the stereoscopic cinema images;
   wherein the stereoscopic cinema images are derived from multi-view images from which the device display images are derived.

13. The method of claim 12, further comprising:
rendering the left view device display images by emitting light rays from the left view imager;
rendering the right view device display images by emitting light rays from the right view imager.

14. The method of claim 12, wherein the device display represents a virtual display.

15. The method of claim 12, wherein the device display represents a physical display.

16. The method of claim 12, wherein the left view device display images and the right view device display images are rendered on the device display at a single image plane.

17. The method of claim 12, wherein the left view device display images and the right view device display images are rendered on the device display at multiple image planes.

18. The method of claim 12, wherein the left view cinema display images and the right view cinema display images, as rendered on the cinema display, are separated by the left view optical stack and the right view optical stack based on light polarization states.

19. The method of claim 12, wherein the left view cinema display images and the right view device display images, as rendered on the cinema display, are separated by the left view optical stack and the right view optical stack based on a shutter-based mechanism.

20. The method of claim 12, wherein the left view cinema display images and the right view device display images, as rendered on the cinema display, are separated by the left view optical stack and the right view optical stack based on light polarization.

\* \* \* \* \*